C. A. D. HAFNER.
FISHPOLE SUPPORT.
APPLICATION FILED JULY 8, 1919.
1,352,663.
Patented Sept. 14, 1920.
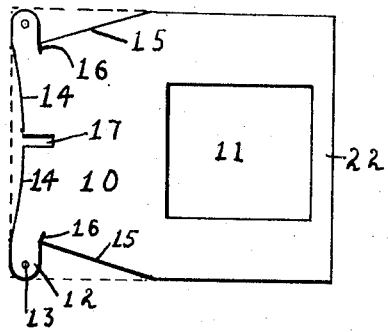
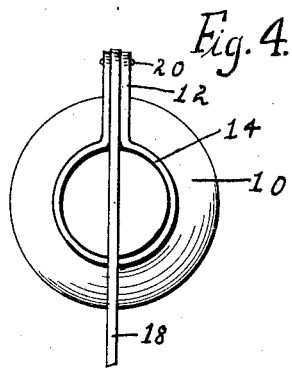
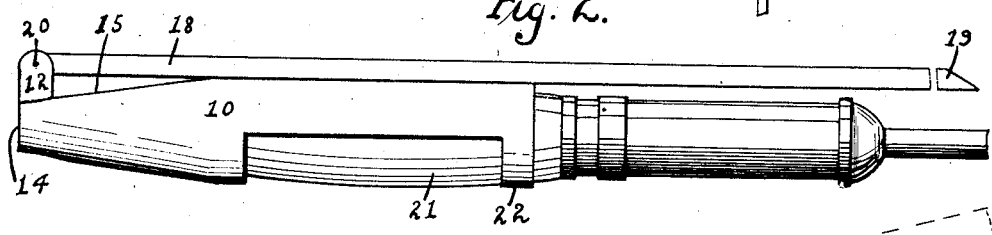
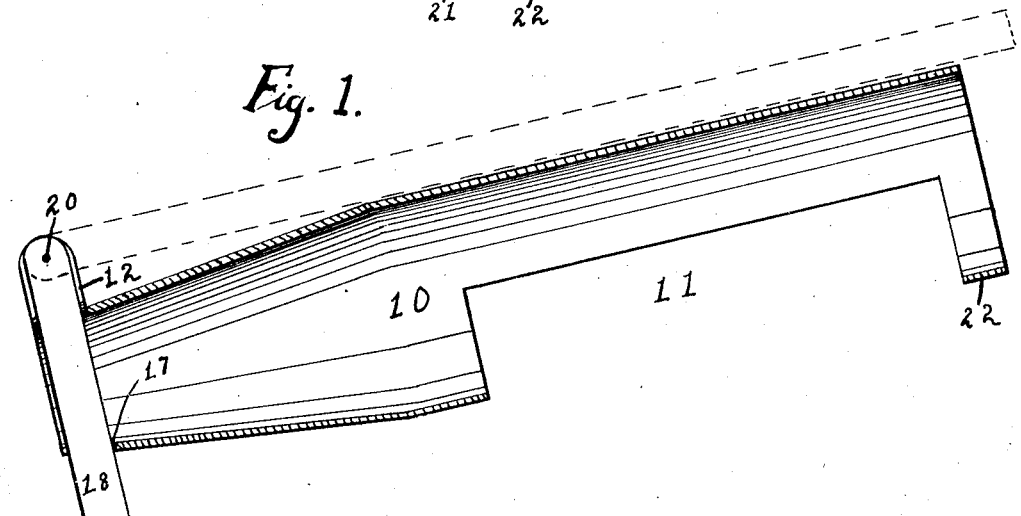
INVENTOR
Charles A. D. Hafner.
By Orwig & Bair Atty's.

UNITED STATES PATENT OFFICE.

CHARLES A. D. HAFNER, OF DES MOINES, IOWA.

FISHPOLE-SUPPORT.

1,352,663.

Specification of Letters Patent.  Patented Sept. 14, 1920.

Application filed July 8, 1919. Serial No. 309,399.

*To all whom it may concern:*

Be it known that I, CHARLES A. D. HAFNER, a citizen of the United States, and a resident of Des Moines, in the county of Polk and State of Iowa, have invented a certain new and useful Fishpole-Support, of which the following is a specification.

The object of my invention is to provide a fish pole support of simple, durable and inexpensive construction.

A further object of my invention is to provide a fish pole support which may be carried in the case provided for a sectional fish pole, and which may be used for supporting the pole along the bank of the stream or lake, when the pole is assembled for fishing.

A further object of my invention is to provide such a support adapted to engage the butt end of the fish pole to hold the latter in any of a plurality of inclined positions, when it is desired to leave the pole without an attendant.

A further object of my invention is to provide a socket, which will closely grip the butt end of the pole when the socket is held in an inclined position, but which will permit ready removal of the pole.

A further object of my invention is to provide a supporting pole or rod, which may be pushed into the ground at any angle to thereby control the inclination of the pole socket, and which may be readily cleaned when removed from the ground.

A further object of my invention is to provide a pole holding socket upon the supporting pole, so that if desired the pole may be inverted upwardly without removing it from the socket in order to hook a fish.

With these and other objects in view my invention consists in the construction, arrangement and combination of the various parts of the device, whereby the objects contemplated are attained, as hereinafter more fully set forth, pointed out in my claims and illustrated in the accompanying drawings, in which:

Figure 1 is a vertical, longitudinal, sectional view through my improved device illustrating the method of installing the device in the ground.

Fig. 2 is a side elevation of the device with a portion of a fish pole shown as inserted in the socket.

Fig. 3 is a plan view of the blank, from which my improved socket device is formed. The original shape of the blank being indicated by the dotted lines.

Fig. 4 is an end elevation of the device.

Referring to the accompanying drawings, I have used reference numeral 10 to indicate generally the blank from which my socket is formed. The blank 10 is originally cut to a square or oblong shape, and then the opening 11, ears 12, openings 13, curved portions 14 and inclined portions 15, the slits 16, and the recess 17. From the shape of the blank as formed by the last mentioned cuts, it will be seen that it may be rolled to form a substantially, cylindrical portion adjacent to the opening 11, a contracted portion adjacent to the inclined portions 15, and spaced outwardly extending ears at the end of the contracted portion. When the blank is thus rolled recesses are formed in the end of the blank adjacent to the ears 12 and at 17 on the side opposite the ears. A pole or rod 18 has pointed end 19 and an opening in the other end adapted to receive the pin 20, which is also extended through the openings 13 in the ears 12.

From the construction of the parts just discussed, it will be seen that the rod 18 may be swung from the positions shown in full lines in Fig. 2 upon the pin 20 to the positions shown in full lines in Fig. 1. When it is in the latter position the sides of the recesses 17 and the end thereof together with the pin 20 will hold outer end of the socket member from swing downwardly and from later swing.

It will thus be noticed that the angle at which the pole 18 is inserted into the ground will govern the angle of the socket member to the ground and, consequently, of the fish pole relative to the ground, which may be inserted into the socket. This is due to the fact that the sectional fish poles, which are ordinarily used, are provided with a slight compressible cork handle, so that when the pole is inserted in the socket the cork portion 21 will be•held in contact with the band 22 formed in the lower side of the socket member adjacent to the opening 11, so that the retaining band will somewhat compress the cork, thereby preventing accidental displacement of the pole from the socket.

This effect is further enhanced by the fact that the cork handles 21, which are ordinarily provided for such fish poles are larger at their central portions, than they are at either end. If the parts are, therefore, installed, as shown in Fig. 1, and the pole inserted in the socket, then the retaining member 22 will substantially lock the pole from movement out of the socket by its contact with the holder 21.

If, however, it is desired to remove the pole, it may be freed from the retaining band 22, by merely lifting the handle clear from the band and the pole may be readily slid out of the socket.

If it is desired to hook a fish, which is nibbling at the bait on the line without removing the pole from the socket, the pole may be swung upon the pivot 20 by a sudden upward jerk on the pole.

As the pole formed as shown, it will be seen that the part which is inserted into the ground may be readily cleaned by drawing it across any suitable material, such for instance, as tree-bark or grass, so that when the parts are folded up as in Fig. 2, the pole will not have dirt, which will soil the inside of the fish pole case.

The end of the pole 18 adjacent to the pin 20 is purposely formed to extend somewhat upwardly from the ears 12 or else to lay flush with the up edges of the ears 12 when the pole is in the position shown in full lines in Fig. 1, so that the end of the pole may be driven with a rock or any other suitable hard object into the ground in case the latter is hard rock.

Some changes may be made in the construction and arrangement of my device without departing from the essential features and purposes thereof, and it is my intention to cover by my claims any modified forms of structure or use of mechanical equivalents which may be reasonably included within the scope of my claims.

I claim as my invention.

1. In a device of the class described a substantially cylindrical socket, having registering recesses in one end, spaced outwardly extending ears fixed to the cylinder at either side of one of said recesses, said ears having alined openings therein, and a rod having one end pivoted in said openings whereby said rod may be swung from position with its longitudinal axis parallel with the longitudinal axis of the socket to position within said recesses.

2. In a device of the class described a substantially cylindrical socket having a contracted portion adjacent to one end and registering recesses in the said end, spaced outwardly extending ears fixed to the cylinder at either side of one of said recesses, said ears having alined openings whereby said rod may be swung from position with its longitudinal axis parallel with the longitudinal axis of the socket to position within said recesses.

3. In a device of the class described a substantially cylindrical socket of resilient material having a contracted portion adjacent to one end, registering recesses in the last mentioned end, and an elongated opening adjacent to the other end whereby a comparatively narrow resilient band may be formed adjacent to the last described end, spaced outwardly extending ears fixed to the cylinder at either side of one of said recesses, said ears having alined openings therein, and a rod having one end pivoted in said openings whereby said rod may be swung from position with its longitudinal axis parallel with the longitudinal axis of the socket to position within said recesses.

4. In a device of the class described a cylinder having a recess formed in one end, and a rod pivoted to the cylinder opposite said recess adapted to be swung to enter the recess and to position with its longitudinal axis parallel with the longitudinal axis of the cylinder.

CHARLES A. D. HAFNER.